United States Patent [19]
Vetsch

[11] 3,877,304
[45] Apr. 15, 1975

[54] FLOWMETER

[75] Inventor: LeRoy E. Vetsch, Seattle, Wash.

[73] Assignee: Eldec Corporation, Lynwood, Wash.

[22] Filed: Nov. 29, 1973

[21] Appl. No.: 420,078

Related U.S. Application Data

[63] Continuation of Ser. No. 116,492, Feb. 18, 1971, abandoned.

[52] U.S. Cl............................................. 73/231 M
[51] Int. Cl............................................. G01f 1/12
[58] Field of Search..... 73/194 M, 203, 230, 231 R, 73/231 M; 137/512.15

[56] References Cited
UNITED STATES PATENTS

| | | | |
|---|---|---|---|
| 2,236,320 | 3/1941 | Mosel | 137/512.15 |
| 2,609,660 | 9/1952 | Tenney et al. | 137/512.15 X |
| 3,060,682 | 10/1962 | Kemenczky | 137/512.15 X |
| 3,308,662 | 3/1967 | Maurer | 73/231 M |
| 3,538,767 | 11/1970 | Pustell et al. | 73/231 M |
| 3,575,052 | 4/1971 | Lenker | 73/231 M |
| 3,613,451 | 10/1971 | Scott | 73/231 M |

*Primary Examiner*—James J. Gill
*Attorney, Agent, or Firm*—Christensen, O'Connor, Garrison & Havelka

[57] ABSTRACT

An improved fluid flowmeter is disclosed which utilizes energy of the moving fluid to drive the measurement assembly. A turbine assembly disposed in the flow path is driven by the moving fluid and incorporates a valve assembly responsive to the moving fluid to control the bypassing of a portion of the fluid around the drive surfaces of the turbine. The valve assembly includes a spring member having a plurality of leaves positioned across openings in the turbine assembly. The speed of the turbine is controlled by the valve system in a manner which enhances system operation at very low as well as high flow rates.

18 Claims, 6 Drawing Figures

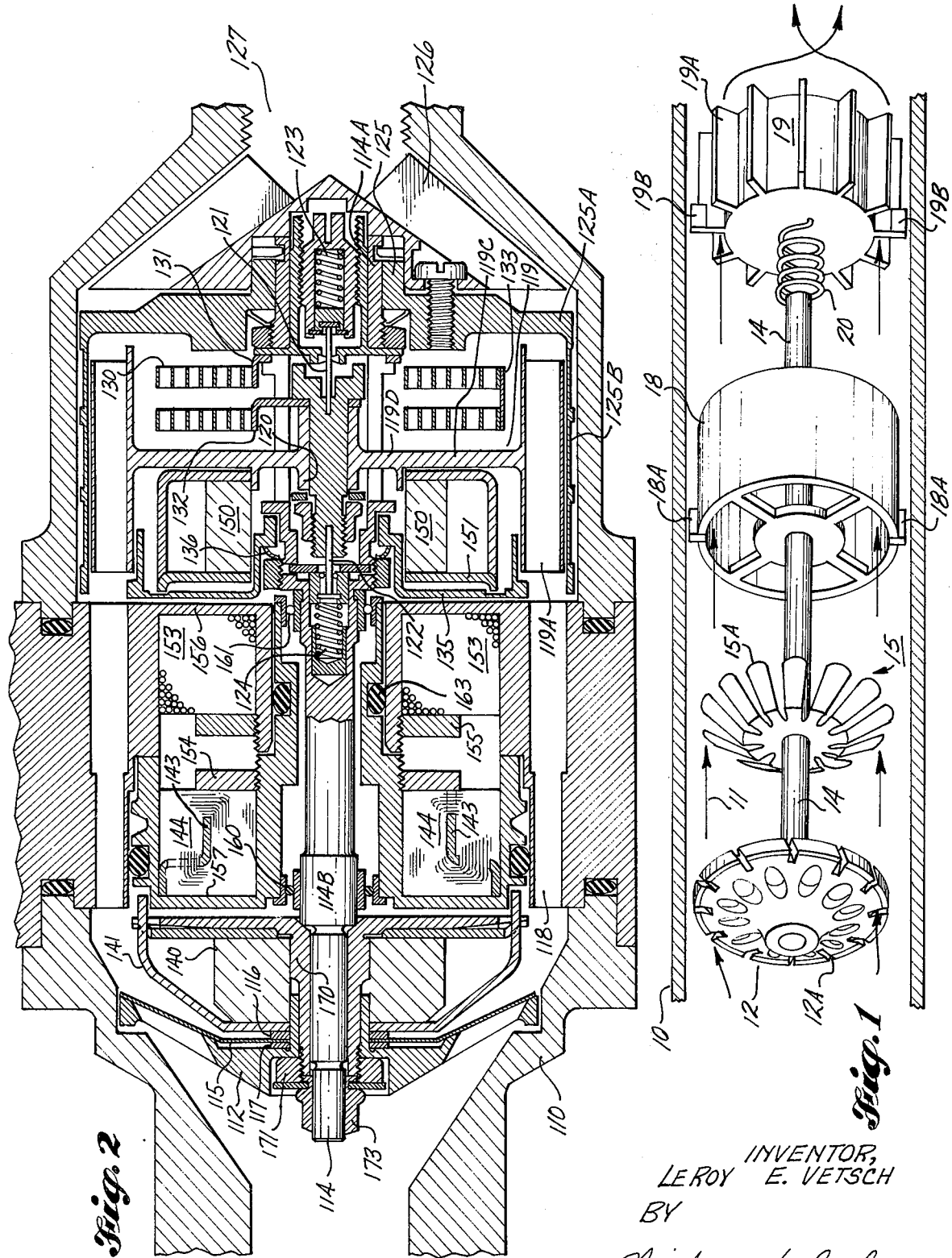

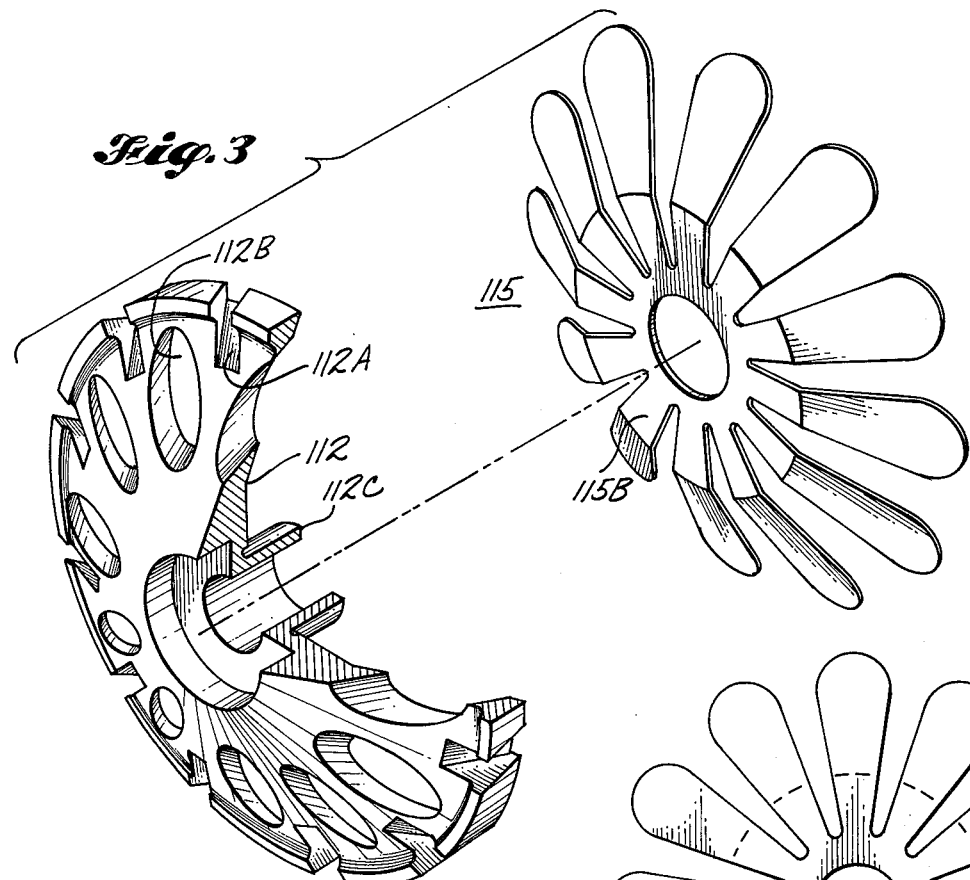
Fig. 3
Fig. 4
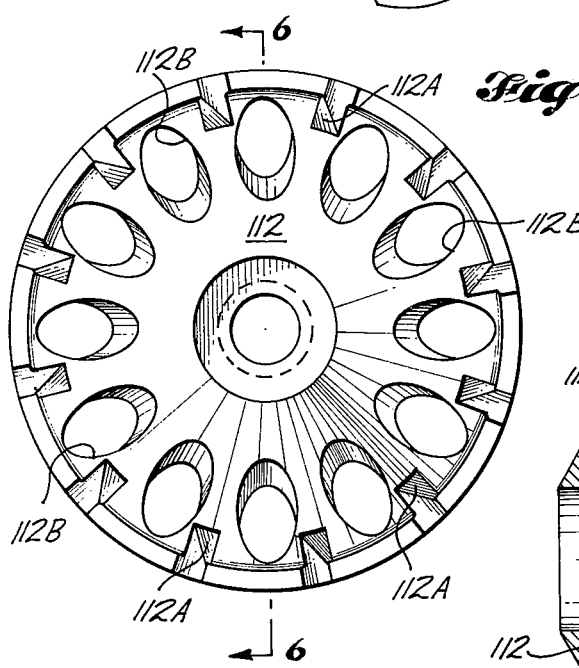
Fig. 5
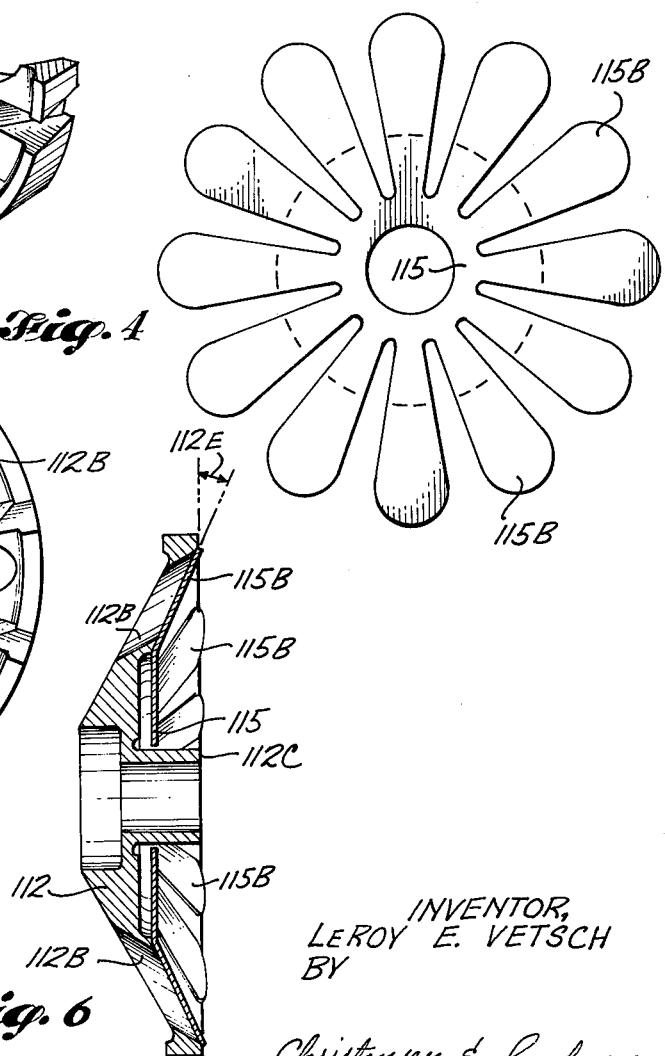
Fig. 6
INVENTOR,
LEROY E. VETSCH
BY
Christensen & Sanborn
ATTORNEYS

FLOWMETER

This application is a continuation of application Ser. No. 116,492, filed Feb. 18, 1971, now abandoned.

Various industries presently require accurate fluid flowmeters, as for example the aircraft industry. In some such systems used for measuring fuel flow the fuel has a certain angular momentum imparted to it. Then a spring-restrained assembly in the path of the moving fuel is calibrated so that the angle of deflection of the spring-restrained member will provide information regarding fuel flow. In many such systems a highly accurate motor drive assembly is required for imparting angular momentum to the fuel.

In other systems the moving fluid is used for driving a turbine which then drives a measurement assembly. British Pat. No. 1,069,466 discloses one typical type of mass flowmeter wherein a turbine located in the path of the moving fluid is driven by the fluid. The turbine moves a second member (referred to as an impeller) which is resiliently coupled thereto. The angular displacement between the first and second members is then used to provide the desired data regarding the mass of the fuel flowing in the system. In such systems (typically referred to as motorless fuel flowmeters) a difficulty is encountered when the same basic design or same transmitter assembly is to be used with widely varying flow ranges.

It is therefore an object of the present invention to provide an improved fluid flowmeter. An object of the invention is to provide a mass flowmeter using a fluid-driven turbine and impeller assembly.

An additional object of the present invention is to provide an improved fuel flowmeter utilizing energy of the moving fuel to operate the flowmeter. An additional object is to provide such a system which incorporates a novel valve arrangement adapted to automatically divert a varying portion of the moving fuel away from a turbine apparatus and thereby enhance system operation over widely varying flow rates.

In accordance with the teachings of the present invention a fluid driven turbine is located in the path of the moving fluid so that the turbine will rotate in response to fluid flow. The measurement assembly includes an impeller which is spring-connected to the turbine and is adapted to impart angular momentum to the fluid. The fluid reaching the impeller has little or no angular momentum associated therewith since flow straightening vanes are located between the turbine and the impeller. The impeller assembly lags the turbine by an angle which is proportional to the momentum being imparted to the fluid by the impeller assembly. This lag angle is measured and provides information signals proportional to the mass of the fuel flowing. A unique valve assembly forming part of the turbine is adapted to bypass fuel around the turbine blades as flow rate increases. Thus the system can be used at very low as well as high flow rates.

The above and additional advantages and objects of the invention will be more clearly understood from the following description when read with reference to the accompanying drawings.

FIG. 1 is a diagrammatic illustration of the overall system of the present invention.

FIG. 2 is a detailed cross-sectional view of a preferred embodiment of the invention.

FIG. 3 is an enlarged perspective view (partially sectioned) showing the valve and turbine blade assembly.

FIG. 4 is a front view of the valve assembly.

FIG. 5 is a front view of the valve and turbine blade assembly.

FIG. 6 is a cross-sectional view along the lines 6—6 of FIG. 5.

Referring now to the drawings and in particular to FIG. 1 the general principles of operation will be most clearly understood by reference to FIG. 1. Therein it will be seen that an elongated tubular housing 10 has the fuel indicated by arrows 11 flowing therethrough. A turbine assembly indicated at 12 has angled slots 12A forming blade surfaces which react in response to fuel flow to rotate the drive shaft 14. Fuel bypass holes 12B are provided in the turbine blade assembly. A valve assembly 15 having leaves 15A forms part of the turbine assembly with the leaves 15A covering holes 12B. The blades 15A serve to automatically permit a selected portion of the fuel to pass through the holes 12B rather than across the blade slots 12A. A drum 18 is secured to the shaft 14 and thus rotates with the shaft. An impeller assembly 19 is connected to the shaft 14 by spring 20 and thus the impeller also rotates with the shaft but lags the shaft. The housing 10 includes straightening vanes between the turbine and the impeller so that fluid passing downstream (left to right in FIG. 1) will have virtually no angular momentum when the fluid passes between adjacent radial vanes 19A which form part of the impeller 19. As described hereinafter the impeller 19 is located inside the drum 18.

After leaving the impeller 19 the fuel typically engages additional straightening vanes and continues downstream to the engine using the fuel.

As described above, the fuel passing through the annular spaces defined by the vanes 19A in the impeller assembly causes the impeller to be deflected relative to the drum due to the torque required to impart an angular momentum to the fuel by the impeller vanes. Since the spring 20 has a linear torque/deflection characteristic, the deflection angle is a measure of this torque. The greater the mass flow rate, the larger the deflection of the impeller relative to the drum. This deflection is conveniently measured by attaching magnets 18A and 19B to the drum and impeller, respectively, and placing two pick-off coils in the non-magnetic housing 10. The time lag or displacement, $\Delta t$, of the impeller pulses relative to the drum pulses is directly proportional to the mass flow rate. The signal processing techniques are well known and form no part of the present invention.

In one system well known in the art the time $\Delta t$ is measured by using the drum and impeller signals to gate on and off a high frequency signal generator which provides output signals to a counter.

Specific details of a preferred embodiment of the invention are illustrated more clearly in FIG. 2. Therein it will be seen that the turbine 112 is disposed inside the housing 11 and is secured to the shaft 114. The turbine 112 is illustrated more clearly in FIG. 3. The embodiment shown is an aluminum casting having angled slots 112A cut therein so that as the fluid passes through the slots the turbine and hence the shaft will be rotated.

The valve assembly 115 includes the leaf springs 115A best illustrated in FIGS. 3 and 4. In FIG. 3 it will be seen that the leaf springs extend generally radially outward from a central hub portion 115B. The hub portion 115B has a central hole which mates with the collar 112C on the turbine. Washers 116 and 117 (FIG. 2) hold the valve 115 positioned with the leaves 115A pressed into engagement with the turbine 112 covering the holes 112B. The leaves 115A are bent at an angle of approximately 20° with respect to the plane of the hub portion 115B so that the leaves are normally preloaded against the back side of the turbine. As best seen in FIG. 6 the back side of the turbine adjacent the holes 112B is conical and forms an angle of approximately 65° with respect to the collar 112C.

At low flow rates the leaves 115A substantially prevent the passage of fuel through holes 112B. As flow rate increases the leaves are deflected and thus part of the fuel bypasses the turbine blades 112A and flows through the holes 112B. In this way the turbine is made to operate at a substantially constant speed over a wide range of flow rates.

The fuel which passes through the turbine blades 112A and the bypass openings 112B engages the straightening vanes 118 in the housing wall. From there it passes into the slots defined by adjacent vanes 119A of the impeller 119.

The impeller assembly 119 has a solid central web portion 119C which terminates in two central strut portions 119D. These struts are integral with the central portion 120 of the impeller. The impeller is supported for rotation independent from the shaft 114 by means of the bearing assemblies 121 and 122. The coil springs 123 and 124 serve to protect the jewels of the bearing assembly in the event of undue shock. Other bearing and support arrangements can obviously be used for supporting the impeller for rotation relative to the shaft 114.

The drum 125 is secured to the right end of shaft 114 indicated generally at 114A. The outer shroud portion 125B of the drum 125 is connected to the central hub portion by means of struts 125A which permit passage of the fuel flowing through the slots of the impeller. Energy recovery vanes 126 near the exit opening 127 of the assembly (referred to in the art as a transmitter) are secured to the shaft 114 so that the angular momentum imparted to the fluid by the impeller will be partially recovered in the form of driving energy for the shaft 114.

The spring 130 is shown as being connected at 131 to the drive shaft 114 and at 132 to the central portion of the impeller assembly. The spring 130 is shown being in the form of two coils interconnected at 133 to thus obtain the advantage of a long spring.

To further insure against errors due to viscous drag, a viscous decoupling disc 135 is included in the assembly. It is held in position on the shaft 114 by the crescent spring 136 and rotates with shaft 114. Thus it will be seen that the impeller vanes 119A are substantially protected against viscous drag associated with stationary portions of the transmitter.

While various types of signal pick-up arrangements can be utilized, the system illustrated includes a permanent ring magnet 140 which is carried by the shaft 114 and has the spider-like pole piece assembly 141 associated therewith. The pole piece assembly has four pole faces or teeth 142 extending axially and in alignment with the pick-up pole pieces 143. Pick-up windings are illustrated generally at 144 and are disposed within the stationary transmitter housing. In a similar manner the impeller carries the magnet 150 and pole pieces 151. Impeller pick-up wingings are shown at 153. Nuts 154 and 155 hold the windings in position on stationary frames 156 and 157. Signal output leads pass through the housing wall between adjacent fuel channels 118.

In the arrangement of FIG. 2 the shaft 114 is supported for rotation on the main bearings 160 and 161 with the "O" ring seals 162 and 163 acting as the main seals in the system. It will be seen that the fuel provides lubrication for the bearings.

The shaft 114 has an enlarged shoulder portion 114B. A holding member 170 rests against the shoulder 114B and is adapted to have the magnet 140 and pole assembly 141 positioned thereon. The washers 116 and 117 as well as the turbine 112 and the valve assembly 115 are disposed about the holding member 170. The left end of the member 170 is threaded with the nut 171 serving to compress the various components against the holding member 170. The nut also causes the spring valve member 115 to be placed under a slight load so that the leaves are pressed against the turbine. It is advantageous to have the angle 112E (FIG. 6) of the back surface of the turbine approximately 5° greater than the unstressed angle of the leaves 115A relative to the plane of hub section 115B. In one system the angle 112E was 25° and the leaf angle was 20°. In this embodiment the valve member 115 was made of stainless steel, but other suitable spring materials can be used. In general non-magnetic materials are used to avoid interference with the signal system. The turbine 112 is shown as being formed from a right circular cylindrical of aluminum machined to the shape of a frustrum of a cone. The spring valve 115 is made from flat stock and then formed as shown.

The components between the nut 170 and the holding member 171 can be assembled as a unit and then slid over the left end of the shaft 114. The end cap 173 then holds this assembly onto the shaft 114. The parts are keyed to the shaft for alignment and holding the assemblies in the desired position on the shaft 114.

There has thus been disclosed an improved flowmeter which is particularly useful in measuring the rate of flow of the fuel for an aircraft or other type engine. With the turbine and valve arrangement the transmitter assembly can be utilized in systems having widely varying flow rates. In the embodiment illustrated the bypass holes 112B are shown as cut parallel to the axis of rotation (i.e., without an angled surface to give rotational reaction). In some cases it may be desired to provide these holes with a slight angle in order to derive angular force from the flowing fuel and hence further control and speed of the turbine as the flow rate changes. For example, in a system having extremely high flow rates, it may be desirable to have the bypass holes cut at a slight angle such that as the valve spring permits the bypassing of fuel, such bypassed fuel partially counteracts the driving force derived via the turbine blade slots 12A.

While the invention has been disclosed by reference to the presently preferred embodiments, it will be evident to persons skilled in the art that changes can be made without deviating from the spirit of the invention.

What is claimed is:

1. A flowmeter comprising in combination: housing means having a fluid inlet opening and a fluid discharge opening; a shaft supported for rotation in said housing means; a turbine member secured to said shaft and having a plurality of angled surfaces which are positioned to react with fluid passing thereacross to cause rotation of said shaft, said member having a first plurality of openings therein which extend through said turbine member generally parallel to said shaft; a valve member positioned adjacent said turbine member and including a substantially flat central section and a plurality of individually radially extending leaf spring members, each covering a different one of said first plurality of openings, said valve members being supported for rotation with said shaft wherein the surface portion of said turbine member adjacent said leaf spring members is conical and further including means holding said substantially flat central section of said valve member against said turbine member; impeller means supported for rotation inside said housing means; means including a spring member coupling said impeller means to said shaft so that said impeller means rotates with but lags behind said shaft as a function of mass flow rate.

2. A flowmeter comprising in combination: housing means having a fluid inlet opening and a fluid discharge opening; a shaft supported for rotation in said housing means; a turbine member secured to said shaft and having a plurality of angled surfaces which are positioned to react with fluid passing thereacross to cause rotation of said shaft, said member having a first plurality of openings therein which extend through said turbine member generally parallel to said shaft, a valve member positioned adjacent said turbine member and comprising a thin plate having a plurality of individually movable leaf members, each covering a different one of said first plurality of openings, and means pressing each leaf member against said turbine member, said valve member being supported for rotation with said shaft and turbine member and yieldingly uncovering said first plurality of openings with increases in flow through said flowmeter, the surface portion of said turbine member which is adjacent to said plurality of individually movable leaf members being conical; impeller means supported for rotation inside said housing means; and means including a spring member coupling said impeller means to said shaft so that said impeller means rotates with but lags behind said shaft as a function of mass flow rate.

3. A flowmeter comprising in combination: housing means having a fluid inlet opening and a fluid discharge opening; a shaft supported for rotation in said housing means; a turbine member secured to said shaft and having a plurality of angled surfaces which are positioned to react with fluid passing thereacross to cause rotation of said shaft, said member also having a first plurality of openings therein separate from said plurality of angled surfaces which extend through said turbine member; a valve member adjacent said turbine member and substantially covering said first plurality of openings, said valve member being supported for rotation with said shaft and turbine member and deflecting in response to fluid pressure to yieldingly uncover said first plurality of openings with increases in flow through said flowmeter; impeller means supported for rotation inside said housing means; and means including a spring member coupling said impeller means to said shaft so that said impeller means rotates with but lags behind said shaft as a function of mass flow rate.

4. A flowmeter as defined in claim 3, wherein said valve member has a substantially flat central hub section and a plurality of individual radially extending leaf spring members.

5. The apparatus of claim 4, wherein the outer ends of each of said radially extending members are arcuate.

6. The apparatus of claim 3, wherein said plurality of openings are located radially inward from said angled surfaces.

7. The apparatus of claim 3, wherein said valve member is in the form of a thin plate having a plurality of individually movable leaf members each covering a different one of said openings, and means pressing each leaf member against said turbine member.

8. The apparatus of claim 3, wherein said valve member is provided with a substantially flat central section and a plurality of individual radially extending leaf spring members and wherein each of said leaf spring members is disposed at an angle of approximately 20° relative to the plane of said flat section before assembly.

9. The apparatus of claim 8, wherein said turbine member has an interior conical surface forming an angle of approximately 65° relative to said shaft.

10. The apparatus of claim 3, wherein said openings are located between adjacent ones of said angled surfaces.

11. A turbine and valve assembly for a fuel flow transmitter comprising a turbine member in the shape of a frustrum of a cone having a plurality of fluid bypass holes therethrough and a plurality of turbine blade surfaces; a spring valve plate member having a plurality of spring members each aligned with one of said holes; and means holding said plate member engaged with said turbine member for rotation therewith with said spring members yieldingly covering said holes.

12. The apparatus of claim 11, wherein said holes are located radially inward from said blades.

13. The apparatus of claim 11, wherein said blade surfaces are defined by a plurality of slots cut at an angle around the outer edge of the cone.

14. A flowmeter comprising in combination: housing means having a fluid inlet opening and a fluid discharge opening; a shaft supported for rotation in said housing means; a turbine member secured to said shaft and having a plurality of angled surfaces which are positioned to react with fluid passing thereacross to cause rotation of said shaft, said member having a first plurality of openings therein which extend through said turbine member generally parallel to said shaft; a valve member positioned adjacent said turbine member and substantially covering said first plurality of openings, said valve member having a substantially flat central hub section and a plurality of individual radially extending leaf-spring members, said valve member being supported for rotation with said shaft and turbine member and yieldingly uncovering said first plurality of openings with increases in flow through said flowmeter, impeller means supported for rotation inside said housing means; and means including a spring member coupling said impeller means to said shaft so that said impeller means rotates with but lags behind said shaft as a function of mass flow rate.

15. A flowmeter as defined in claim 14, wherein the outer ends of each of said radially extending members are arcuate.

16. A flowmeter comprising in combination: housing means having a fluid inlet opening and a fluid discharge opening; a shaft supported for rotation in said housing means, a turbine member secured to said shaft and having a plurality of angled surfaces which are positioned to react with fluid passing thereacross to cause rotation of said shaft, said member having a first plurality of openings therein which extend through said turbine member generally parallel to said shaft; a valve member positioned adjacent said turbine member and substantially covering said first plurality of openings, said valve member being supported for rotation with said shaft and turbine member and yieldingly uncovering said first plurality of openings with increases in flow through said flowmeter, said valve member being in the form of a thin plate having a plurality of individually movable leaf members each covering a different one of said openings, and means pressing each leaf member against said turbine member; impeller means supported for rotation in said housing means; and means including a spring member coupling said impeller means to said shaft to that said impeller means rotates with but lags behind said shaft as a function of mass flow rate.

17. A flowmeter comprising in combination: housing means having a fluid inlet opening and a fluid discharge opening; a shaft supported for rotation in said housing means, a turbine member secured to said shaft and having a plurality of angled surfaces which are positioned to react with fluid passing thereacross to cause rotation of said shaft, said member having a first plurality of openings therein which extend through said turbine member generally parallel to said shaft; a valve member positioned adjacent said turbine member and substantially covering said first plurality of openings, said valve member being provided with a substantially flat central section and a plurality of individual radially extending leaf-spring members and wherein each of said leaf-spring members is disposed at an angle of approximately 20° relative to the plane of said flat section before assembly, said valve member being supported for rotation with said shaft and turbine member and yieldingly uncovering said first plurality of openings with increases in flow through said flowmeter, impeller means supported for rotation inside said housing means; and means including a spring member coupling said impeller means to said shaft so that said impeller means rotates with but lags behind said shaft as a function of mass flow rate.

18. A flowmeter as defined in claim 17, wherein said turbine member has an interior conical surface forming an angle of approximately 65° relative to said shaft.

* * * * *